(12) United States Patent
Gianella

(10) Patent No.: US 7,565,263 B2
(45) Date of Patent: Jul. 21, 2009

(54) SYSTEM OF RELEVANT STATISTICS FOR GAMES OF PREDICTION USING TEMPLATES AND PRESENTED IN THE FORM OF TABLES

(76) Inventor: Renato Gianella, Rua Doutour Manuel Carlos de Figueiredo Ferraz, 284 Jardim Vianna, Sao Paulo (BR) SP05655-000

( * ) Notice: Subject to any disclaimer, the term of this patent is extended or adjusted under 35 U.S.C. 154(b) by 1245 days.

(21) Appl. No.: 10/281,392

(22) Filed: Oct. 25, 2002

(65) Prior Publication Data

US 2003/0200053 A1  Oct. 23, 2003

(30) Foreign Application Priority Data

Oct. 25, 2001 (BR) .................................... 0107513

(51) Int. Cl.
*G06F 101/14* (2006.01)
(52) U.S. Cl. .................................... 702/181
(58) Field of Classification Search ................... 463/17; 702/181; 700/91
See application file for complete search history.

(56) References Cited

U.S. PATENT DOCUMENTS

| 5,197,736 | A | * | 3/1993 | Backus et al. | ........... 273/142 R |
| 5,199,709 | A | * | 4/1993 | Lumpp et al. | ............... 273/146 |
| 6,017,032 | A | * | 1/2000 | Grippo et al. | ............ 273/138.1 |
| 6,371,482 | B1 | * | 4/2002 | Hall, Jr. | .................... 273/138.1 |
| 6,783,456 | B2 | * | 8/2004 | White | .......................... 463/18 |
| 2004/0053657 | A1 | * | 3/2004 | Fiden et al. | .................... 463/16 |

FOREIGN PATENT DOCUMENTS

| JP | 2001017633 | * | 1/2001 |
| JP | 2003271776 | * | 9/2003 |
| JP | 2004164257 | * | 6/2004 |

* cited by examiner

*Primary Examiner*—Ronald Laneau
*Assistant Examiner*—Emmanue Omotosho
(74) *Attorney, Agent, or Firm*—William J. Sapone; Coleman Sudol Sapone P.C.

(57) ABSTRACT

The invention is a system of relevant statistics generated for games of prediction using templates and presented in the form of computer generated tables for ease in use by a person for determining the likely outcome of the games. The system shows the equilibrium position in each stage of the evolution of lottery drawings, based on the discovery of the organization of "Discrete Sample Spaces" into templates that allows for the theoretical probabilities of the events to be known and which are obeyed in the game drawings. The calculations and the data have to coincide, to respect the Standard Deviation, and therefore, the system makes possible formulating predictions based on this information using a template that represents all the games with the same behavior pattern, represented by colors.

20 Claims, No Drawings

SYSTEM OF RELEVANT STATISTICS FOR GAMES OF PREDICTION USING TEMPLATES AND PRESENTED IN THE FORM OF TABLES

This invention is directed to a system for generating relevant statistics for games of prediction, for use in templates and presented in the form of tables. These templates show the point of equilibrium at each stage in the evolution of lottery drawings.

BACKGROUND

Over the centuries mathematicians have constructed the Theory of Probability, initially using three mathematically pure steps and then adding other ingenious ideas which have been building up over time.

The three steps were:

A—1654—Pascal—Fermat. The famous correspondence between these two established the bases of the theory of probabilities (Pascal discovered the formulas for combinatorial analysis) which is the mathematical core of the concept of risk.

B—In 1703, G. von Leibniz wrote to his friend Jacob Bernoulli, "Nature has established patterns which are the origin of the recurrence of events, but only for the most part". After twenty years of study this led to Bernoulli's discovery of the "Law of Large Numbers" ("Ars conjectande"—The Art of Conjecturing, 1713). Jacob Bernoulli's theory for the a posteriori calculation of probabilities is empirical since it does not offer a method for organizing all the Discrete Sample Spaces mathematically and for allowing the theoretical probability of their events to be known a priori and exactly. Contrary to the popular idea, the law does not provide a method for validating observed facts, and which are nothing more than the incomplete representation of the total truth.

In essence the law states:

"In any sample the difference between the value observed and its true value will decrease proportionally as the number of observations increases". A mathematical explanation of the law is therefore needed.

Discrete Sample Spaces—These are all the possible outcomes of an experiment.

Experiment—Experiments are those acts which, when repeated constantly under the same conditions, produce individual results, which we are unable to predict. However, after a certain number of repetitions a defined pattern or regularity will occur. This is the regularity which makes it possible to build an accurate mathematical model with which the experiment can be analyzed.

The lottery draw is a random experiment.

C—In 1773, Abraham de Moivre expounded the structure of normal distribution—"the bell-shaped curve"—and discovered the concept of "standard deviation" ("the doctrine of chances"). De Moivre's success in solving these problems is one of the most important achievements in mathematics. Eighty-three years later, when studying geodetic measurements taken in Bavaria, Gauss arrived at the same conclusion. "A Standard Deviation of 2% is accepted by the majority of statisticians".

A simple analysis of these three steps shows that the gap which exists has to do with the knowledge of the organization of Sample Spaces, since this is what will allow us to analyze the experiment (lottery drawings) mathematically.

This process is at present carried out using statistics based on observations which have no foundation.

There are Internet sites and pamphlets distributed at Lottery Sales outlets which state, for example:

6 has been drawn 3 times with 27

17 has not appeared in the last 20 drawings

In other words, curious, interesting and casual observations.

Previous mathematical proposals are unknown.

The solution here suggested is based on a methodology which organizes "Discrete Sample Spaces" into patterns. This allows us to calculate the theoretical probability of the events, which are obeyed in the draws. If the calculations of the patterns (or templates) and the facts must coincide (respecting Standard Deviation) then it is possible to make predictions based on this information. A template is produced which represents all the games with the same behavior pattern. These games are represented by colors.

Example

If we play with the following numbers.

| 01 | 02 | 11 | 23 | 36 | 45 |
|----|----|----|----|----|----|
| 01 | 03 | 10 | 21 | 30 | 42 |
| 02 | 03 | 12 | 20 | 34 | 44 |
| 04 | 07 | 14 | 24 | 33 | 42 |
| 05 | 08 | 17 | 28 | 31 | 42 |
| 06 | 07 | 18 | 22 | 37 | 47 |
| 07 | 08 | 15 | 21 | 32 | 46 |
| 04 | 07 | 14 | 24 | 33 | 42 |
| 05 | 08 | 17 | 28 | 31 | 42 |
| 06 | 07 | 18 | 22 | 37 | 47 |
| 07 | 08 | 15 | 21 | 32 | 46 |
| .  | .  | .  | .  | .  | .  |
| .  | .  | .  | .  | .  | .  |
| .  | .  | .  | .  | .  | .  |
| 08 | 09 | 19 | 29 | 39 | 48 |

. . . then we are systematically playing using the same pattern or template, i.e. we always mark 2 numbers in the zero decile, 1 number in the first decile, 1 number in the second decile, 1 number in the third decile and 1 number in the fourth decile.

Each template has its own theoretical probability precisely predetermined and this is obeyed in the drawings. If the calculations and the facts must coincide (respecting Standard Deviation) we can make predictions based on the "search for the probability that an increase in the number of drawings will increase the probability that the observed mean will not deviate more than 2% from the true mean".

The technical advantages are provided by the computer which shows the statistics of the templates and numbers in a relevant and dynamic way. In any and every lottery the Sample Spaces are dramatically simplified, so that a user need not understand statistics to identify patterns and select high probability numbers for entering in a lottery drawing.

Example

The Super Sena 6-48 type lottery, with 12,271,512 combinations (possible plays) can be represented by only 210 templates, each one with its precise theoretical probability. Therefore it is possible to manage lottery results, given that any game which is played corresponds to one of the templates.

The practical advantage of this is the rationalization of the information, allowing for calculated decisions to be taken. By using colors to represent the patterns (or templates) it is possible to manage the whole system via computer, accessible for example, by a user over the internet.

In 5 years of study and research we can state categorically that everything which exists is based on the observation of past data. This is a criterion not permitted by the law of Large Numbers since this data does not express the whole truth.

The solution we intend to patent is capable of constructive operational variables since it is the result of a precise "mathematical and probabilistic model" and this begins a new phase in our knowledge of the movement of things.

It will become a central tool in any activity involving random movements, such as: genetics, finance, engineering, etc.

The discovery relates theoretical probabilities with facts, since the Law states that the mathematical regularity of an event must be obeyed, i.e., if the theoretical probability of a template is 3%, this means that this pattern should occur about 3 times every 100 draws.

In order to comply with the letter of the law the number of drawings must be the largest possible, but the theoretical probability of any pattern occurring is already sufficiently significant for it to be respected throughout the drawings.

If we compare the information available on the various probabilities of Starts, Types of Sets, Patterns and Numbers, we have a solid base and are therefore well equipped to formulate predictions as to what may happen in the future.

In this we are supported by precise and pertinent information and in accordance with the Law.

The fact that the concepts being used are classic is justification enough for leaving out bibliographic references.

Analysis

When we study any type of observed phenomenon, we have to formulate a Mathematical Model which will help us investigate this phenomenon in a precise way.

In the case of the Cn and p phenomena the challenge initially is to solve the mathematical problem, i.e. find a method which organizes Sample Spaces, whilst meeting the requirements of cause and effect.

Undoubtedly, this is the responsibility of Combinatory Analysis, since the evolution of combinations shows clearly that everything happens in deciles; that is, as basic hypotheses, combinations of deciles themselves and combinations of numbers in the same decile.

A generic solution was used which indicated all the possible combinations, given that we have combinations within combinations.

The colors reveal the forms and when we combine them in an orderly manner in predetermined spaces all the possible types of combination appear.

The resulting system is set out in the form of templates which are the synthesis of the whole natural process.

Following the precise indications given by the colors the systems come together. It is like a symphony.

After the initial harmony, the single notes come in, followed by pairs, then the trines and so forth until the final coming together of the movements.

The hypotheses are confirmed in the first movement and are repeated as in the nature of things.

Templates function as the synthesizer—the catalyst of the system. But we had to understand them in their totality.

Leibniz wrote to Bernoulli:

"Nature has established patterns which give rise to the recurrence of happenings, but only for the most part".

Up until now there has been no methodology which organizes Sample Spaces in a causal way and which is capable of noticing, even in a simple way, the most obvious and repetitive facts in the world of experience: their patterns of behavior.

The world knows Bernoulli's Law of Large Numbers empirically. It needs an explanation.

But templates are not merely the synthesis. They also constitute the behavior patterns and the establishment of these patterns relies on the precise and a priori calculation of theoretical probabilities.

The template concept demonstrates an extreme logical coherence. Besides indicating the patterns of behavior, it shows that the causes of the occurrence of patterns are the very patterns themselves.

But sets of similar patterns of behavior are not evident in the natural evolution of combinations.

We needed to deduce them, to identify them in the natural assembly and classify them in sets in accordance with similar patterns of behavior.

In the end, the Method gave structure to the system.

Colors are used to produce the various templates, which are defined by the product of the simple combinations which they represent.

The templates rely on patterns of behavior which, when quantified, reveal the Theoretical Probabilities. And all the Sample Spaces become viable.

The basic hypotheses are the perfect answer to the need for a causal explanation (Paul L. Meyer in "Probability—Applications in Statistics"—$2^{nd}$ edition, Chapter 1).

Mathematical Models.

When choosing a model, we can make use of our own critical judgment. This was particularly well expressed by Prof. J. Neyman, who wrote:

"Every time we use Mathematics to study some observed phenomena, we must basically begin by constructing a mathematical model (deterministic or probabilistic) for these phenomena:

1. The model must, inevitably, simplify things.
2. Certain details should be ignored. The good result of the model depends on the fact that the details which have been ignored are (or are not) really of no importance when it comes to explaining the phenomenon being studied.
3. The solution of the mathematical problem may be correct but nevertheless, it might be at total variance with the observed facts, purely because the basic hypotheses have not been confirmed. Generally speaking it is very difficult to state with conviction that a particular mathematical model is suitable or not, before some observation data have been acquired.
4. In order to verify the validity of the model, we must deduce a certain number of consequences from our model and then compare these predicted results with our observations.

Based on this critical opinion let us examine the Model.

1 Sample Spaces are organized and reduced to groups of templates, or patterns.

| Example | Combinations | Groups of templates |
|---------|--------------|---------------------|
| C60,6   | 50,063,860   | 714                 |
| C80,5   | 24,040,016   | 1122                |
| C48,6   | 12,271,512   | 210                 |

2 Nothing was ignored

3 The mathematical problem has been correctly solved and the basic hypotheses are fully confirmed, since the mathematical solution of the problem allows for knowledge of all the data of the Sample Spaces 4 There was a mathematical regularity to all the perfectly obeyed consequences.

Predicted results

Standard deviation

Observations

The model satisfies the above stated requirements (if a series of repetitive experiments agrees with an hypothesis, a law can be stated which governs the phenomenon by means of mathematical derivation and from experimental data).

We would add:

1 The Organization of Sample Spaces must define the behavior patterns and respond to the need for causal explanation.

2 Theoretical Probabilities must be determined both a priori and precisely.

The figures which accompany this patent are taken from the Spanish and French 6-49 type lotteries, showing the behavior of those templates (patterns) which have the same probability. Spain and France have the same type of game (6-49), and therefore the same Theoretical Probability Table.

DETAILED DESCRIPTION

The System, which is the subject of this application, reveals by means of a simple and colored representation the complex and sophisticated working for predicting lottery outcomes.

Contrary to what might be thought, it shows that the results of the drawings follow a pattern of behavior.

It shows that each lottery has an exact number of ways of playing called the template, each of which has its own probability of being drawn.

It provides tables with up-to-date, relevant information which allows for an objective analysis and the choice of a template.

The choice of templates will be the first concern of the player.

A 5-49 lottery (meaning 5 from 49) means that 5 numbers are drawn from a group of 49. In the same way 6-48 gives us 6 numbers to be drawn from a group of 48, and so on.

Examples

| Lottery Name | Type | Total number of combinations | Templates (sample space) |
| --- | --- | --- | --- |
| Powerball (USA) | 5-49 | 1,906,884 | 126 |
| Super Sena (Brazil) | 6-48 | 12,271,512 | 210 |
| Denmark | 7-36 | 8,347,680 | 120 |

The total number of possibilities for each lottery, by template in decreasing order of probability, is shown in the Theoretical Probability Table.

Lotteries like the Super Sena, Mega Sena, Quina, Canadian Lotto, German Lotto, Spanish Lottery, French Lotto, Australian Lotto, National Lottery (England) and dozens of others in the United States, have extremely well-known structures and therefore are capable of being managed.

Our aim is to show the behavior of the results in games of prediction and supply relevant information to users, preferably via a subscription service, so that rational game strategies can be formulated.

Color Convention

One of the aims of the method which is the subject of this patent is to visualize the games in a simple and efficient manner. To achieve this we created a way of representing numbers by means of colors. Each decile is associated with a color and is given a name. The denomination of each decile is defined by its initial number so for example, the numbers 01, 02 and 09 are called numbers of the zero decile (DO) and so on.

The color convention we used is shown in table 1. Examples of games using the normal representation and the representation using colors are shown in table 2.

Each game has a corresponding template; to identify it you only need to use the colors. Each template has a certain probability of happening.

Templates

A 6-48 type lottery (the Brazilian Super Sena) has a total of 12,271,512 combinations which can be represented by a mere 210 templates.

A template represents a "pattern of behavior". See examples in table 3.

We classify the templates by types which have a common characteristic. The two first examples in table 3 show the P type templates; that is, they show the formation of a pair of numbers of the same color. The third example shows three pairs of the same color, and so it is a PPP type. The last example has a trine of the same color and is therefore a T type.

The types of current templates are shown below:

| Key | |
| --- | --- |
| Type | Description |
| P | Pair of the same color |
| PP | Two pairs of a different color |
| PPP | Three pairs of a different color |
| Q | Four numbers of the same color |
| QP | Four numbers of one color with a pair of another color |
| S | Six numbers of the same color |
| T | Trine of the same color |
| TP | Trine of one color with a pair of another color |
| TT | Two trines of different colors |
| U* | Single number, no color repeated |
| V | Five numbers of the same color |

*The U type does not exist in the Super Sena

The Template Table by Order of Theoretical Probability shows each one with their respective occurrence possibilities (calculation). Each lottery has its own table.

Table of Theoretical Probability

The Table of Theoretical Probability shows the templates arranged in decreasing order of occurrence.

Theoretical Probability=Calculation

In table 4 we show a sample of the Probability Table for a 6-48 type game.

It shows for each template:

Its number—2

The representation in colors—3

The theoretical probability=calculation

Therefore in the examples shown in this table we would expect to see, on average, nearly three occurrences of templates 1 and 2 in every 100 drawings, or put in another way, nearly 30 occurrences in every 1000 drawings. On the other hand for template 18, we would expect on average nearly 1 occurrence for every 100 drawings, or put in another way, nearly 13 occurrences in every 1000 drawings. For templates 209 and 210 the probability is around 7 occurrences in every 1,000,000 drawings.

It is important to note that the larger the number of draws the closer the mean of the numbers gets to the calculation.

The behavior of the templates over a series of drawings is shown in the Columns Table Table of Drawings The Table of Drawings shows in an organized way the results of all the draws. A well constructed table of draws provides important information. In our table we use:
Date of the drawing
Number of the drawing
Numbers drawn presented in color according to the color convention.
Number of the template placed in the column according to its type.

In table 5 we give a sample of the draws table from the California Fantasy 5 (5-39). This table is presented in blocks of 100 draws.

Numeric Sum of the Templates

We have seen that the templates have a theoretical probability. A further important property of templates is the numeric sum. If we know it, it can help us discover the range of bets where the chances of winning are greater. The numeric sum corresponds to the sum of all the numbers marked in a game. Therefore, a template will show maximum and minimum values of the numeric sum. The average of these two points is where we find the greater number of occurrences.

Table 6 shows template 1 for a 6-48 game.

The games with the smallest and greatest numeric sums possible in this template are shown in Table 6-B.

The average numeric sum therefore is 137. It can be easily shown that the majority of the combinations occur around the average numeric sum of the template.

Consider the example of two dice. To get a result which has the numeric sum 2 there is only one possibility: that both dice have the 1 spot face showing. The same is true for the numeric sum 12 (the dice lie with the 6 spot face showing). 7, on the other hand, which is the average of the numeric sum of the game of dice, can be obtained in six different ways (1 with 6, 2 with 5, 3 with 4, 5 with 2 and 6 with 1).

With the templates the behavior is the same. The greatest occurrence possibility happens around the average of the numeric sum.

The information is shown in the Numeric Sum Table, Table 6-B.

Map of Drawings

The history of drawings by template is shown in a table which we call the "drawings map". This map shows all the draws of each one with the date, drawing number, numbers drawn and the average numeric sum shown at the head of the table.

In Table 7 we present a sample of the "Drawings Map" from template 1 of the Super Sena.

Using the method of the invention, users can take advantage of the system for determining higher probability plays in particular lotteries by subscribing, over the internet or otherwise, to have access to various levels of the templates and associated mathematical information in accordance with a subscription payment plan.

In the "Basic" subscription plan, the drawings map does not show information about the numeric sum. This information is available in the "Intermediate" plan, at a higher subscription rate. Generally, a user would subscribe to the system, to have access to the statistical information developed, generated by computer and accessible in the form of the templates. A subscription type service is appropriate as the data is continually updated as lottery drawing results are generated over time which of course affects the information generated.

In essence, the invention is a method for generating statistical information related to predicting the outcome of a lottery drawing, organizing the data, preparing templates and optionally tables useful in predicting the outcome of a lottery, and providing game players access to the generated data for assisting the players in selecting numbers to play in the lottery. The system is computer based and includes at least one database of data for storing the game outcome historical data for generating the templates and tables, and for supporting access by users, possibly via the internet on a subscription basis, to the system. The method further includes color coding the templates so as to simplify the selection process by a user who is unfamiliar with statistical analysis and probability predictions.

Columns Table

The purpose of the columns table is to show the behavior of each template over the period of the drawings, which are divided into blocks of 100.

It shows in a dynamic way the swings of the templates by always referring the calculation back to the facts.

In Table 8 shows a sample of this table.

Description: On the left hand side it shows the templates with their respective theoretical probability and with their actual occurrence. On the right there are three columns which show the total of the facts divided into blocks of 100 draws. At the top on the right there are links which allow for navigation around the blocks.

We can see that template 3 appeared twice in the first 100 draws, once in the next 100 and five times in draws 201 to 300. This produces a theoretical probability of occurrence of 2.97% and it is showing 3.02% for 300 draws. Template 75 never appeared, but as its theoretical probability is 0.4% it should occur nearly four times in every 1000 draws.

We can see that despite oscillating, in accordance with the Law of Large Numbers, we can state that:
1. The swing is always around the Calculation.
2. In line with the law, the greater the number of draws the nearer to the facts will be the calculation.

This table is an important tool for formulating game strategies.

The Statistics of the Numbers

The statistics always refer to numbers, pairs, trines, etc. for each decile.

The positional statistic shows the total of the occurrences of the numbers, pairs, trines, etc. per decile in each possible position.

Examples of the occurrences of pairs in decile 1 (P1) in accordance with their occurrence per column (only the deciles beginning with 10 are shown) are set out in Tables 9, 9-A, 9-B, 9-C, 9-D and 9-E.

The positional statistic is very useful for analyzing a template. Therefore if we were to play using the template shown in Table 10, we ought to refer to the following statistics:
the occurrence of single numbers in the zero decile (D0) in column C1;
the occurrence of pairs in decile 1 (P1) in columns C2 and C3;
the occurrence of pairs in decile 2 (P2) in columns C4 and C5.

Template Statistics

The correct evaluation test for probabilities is when, on average, the calculation agrees with the facts. Therefore, the evaluation has to be done using a group of templates with the same probability.

An example of the analysis for 1000 drawings:
The first three templates have the same probability, which is 2.97%. Therefore, if we have 1000 draws, these 3 should show 30 draws each. But they are showing 32, 34 and 29.
So the facts are presenting on average $$\frac{32+34+29}{3} = \frac{95}{3} = 31.6633$$

The calculation is=29.70 (rounded up) 30 draws
Average of the facts=31.66 (rounded up) 32 draws.
Analysis:
Templates 1, 2 and 3 should present 30 draws, but they are presenting on average 32.
This table shows the ranking of each template within its own group.
In Table 11 we show the similar behavior of the first 35 templates in a 6-49 lottery (France and Spain).

Positional Table Per Start

The Theoretical Probability Table shows the templates in order of probability. A reorganization of this table, grouping the templates with the same initial colors gives the Positional Table per Start.
Take a 6-48 (Super Sena) game. Any template of this game has to start in one of the ways shown in Table 12.
The Start Table shows a very rapid convergence of the facts for the calculations. It is a great analysis tool for formulating game strategies, since it shows in a fairly succinct way where the drawings are ahead or behind, relative to the calculated position.

Table 13 shows a sample of the Start Table of the Super Sena in accordance with the results up to draw 517 of 21/07/2001.

We can see for each type of possible start the theoretical probability (% calculation) and the percentage of the actual occurrence (% facts) of the starts. The two final columns show the links to the Columns and Drawings Table for the start selected.

In the example in Table 13 we can see that start 1 has a 9.68% theoretical probability and is showing 9.26%, based on facts, up to the draw of 21/07/2001. In Table 14 and 15 there are samples of the Columns and Drawings Tables for this start.

The Columns Table shows, on the left hand side, the templates for the selected start (start 1 in this example) in order of theoretical probability. On the right we have three columns divided into blocks of 100 drawings. On the right hand side at the top, there are the links which allow for navigation through the blocks.

From what we have described so far it is obvious that the subject matter of this patent, a System of Relevant Statistics for Games of Prediction using Templates and presented in the form of Tables, provides totally new characteristics in this field, which merit the granting of an Invention patent.

TABLE 1

| | Decile | Abbreviated name | Color |
|---|---|---|---|
| 1 2 3 4 5 6 7 8 9<br>The numbered squares above are yellow | zero | D0<br>The rectangle above is yellow | Yellow |
| 10 11 12 13 14 15 16 17 18 19<br>The numbered squares above are light blue | One | D1<br>The rectangle above is light blue | Light blue |
| 20 21 22 23 24 25 26 27 28 29<br>The numbered squares above are gray | Two | D2<br>The rectangle above is gray | Gray |
| 30 31 32 33 34 35 36 37 38 39<br>The numbered squares above are green | Three | D3<br>The rectangle above is green | Green |
| 40 41 42 43 44 45 46 47 48 49<br>The numbered squares above are pink | Four | D4<br>The rectangle above is pink | Pink |
| 50 51 52 53 54 55 56 57 58 59<br>The numbered squares above are ivory | Five | D5<br>The rectangle above is ivory | Ivory |
| 60 61 62 63 64 65 66 67 68 69<br>The numbered squares above are red | Six | D6<br>The rectangle above is red | Red |
| 70 71 72 73 74 75 76 77 78 79<br>The numbered squares above are blue | Seven | D7<br>The rectangle above is blue | Blue |

TABLE 1-continued

| Decile | Abbreviated name | Color |
|---|---|---|
| 80 81 82 83 84 85 86 87 88 89<br>The numbered squares above are light green | Eight | D8<br>The rectangle above is light green | Light green |
| 90 91 92 93 94 95 96 97 98 99<br>The numbered squares above are brown | Nine | D9<br>The rectangle above is brown | Brown |

TABLE 2

Examples of games

| Yellow squares | blue square | gray squares | green square |
|---|---|---|---|
| Normal lay-out | | Layout using colors | |
| Blue squares | green squares | | pink squares |

TABLE 3

| Yellow yellow blue gray green pink | This represents all the games where two numbers of the zero decile are chosen and one of each of the other deciles |
|---|---|
| yellow blue blue gray green pink | This represents all the games where two numbers of decile 1 are chosen and one number from each of the other deciles |
| yellow yellow blue blue pink pink | This represents all the games where two numbers of the zero decile are chosen (pair from 0), two from decile 1 (pair from 1) and two from decile 4 (pair from 4) |
| yellow yellow yellow blue gray pink | This represents all the games where three from the zero decile are chosen (trine from decile 1, one from decile 2 and from decile 4 |

TABLE 4

| Number | Template | calculation (%) |
|---|---|---|
| 1 | yellow blue blue gray green pink | 2.97 |
| 2 | yellow blue gray gray green pink | 2.97 |
| 3 | yellow yellow blue gray green pink | 2.64 |
| 18 | blue blue gray green pink pink | 1.32 |
| 209 | yellow yellow yellow yellow yellow yellow | 0.0007 |
| 210 | pink pink pink pink pink pink | 0.0007 |

TABLE 5

Summary of draws from 1 to 100-100 draws

| Type of template | PP | P | T | TP | Q | V |
|---|---|---|---|---|---|---|
| Calculation of the type (%) | 36.93 | 27.36 | 21.88 | 9.85 | 3.83 | 0.15 |
| Quantity of facts | 41 | 22 | 24 | 9 | 4 | 0 |
| Facts (%) | 41.00 | 22.00 | 24.00 | 9.00 | 4.00 | 0.00 |

| Date | Draw | Numbers | Number of the template |
|---|---|---|---|
| 04/02/92 | 1 | 05 08 10 30 38 | 15 |
| 06/02/92 | 2 | 02 09 12 18 21 | 11 |
| 07/02/92 | 3 | 01 06 17 30 35 | 15 |

TABLE 5-continued

Summary of draws from 1 to 100-100 draws

| 11/02/92 | 4 | 09 10 13 14 23 | 20 |
|---|---|---|---|
| 13/02/92 | 5 | 03 15 30 34 38 | 24 |
| 14/02/92 | 6 | 04 08 18 23 39 | 4 |
| 18/02/92 | 7 | 01 09 13 23 30 | 4 |
| 20/02/92 | 8 | 06 18 17 37 38 | 9 |
| 21/02/92 | 9 | 03 11 12 18 33 | 22 |
| 25/02/92 | 10 | 10 11 17 24 27 | 29 |
| 27/02/92 | 11 | 07 18 22 26 37 | 2 |
| 28/02/92 | 12 | 09 10 31 34 39 | 24 |
| 03/03/92 | 13 | 13 18 25 27 34 | 5 |
| 05/03/92 | 14 | 02 07 12 15 32 | 13 |
| 06/03/92 | 15 | 01 09 22 23 32 | 14 |
| 22/09/92 | 100 | 07 10 13 19 20 | 20 |

TABLE 6

Template 1 of a 6-48 game

| yellow | blue | Blue | gray | green | pink |
|---|---|---|---|---|---|

TABLE 6-A

Games with the smallest and largest possible numeric sums

| 01 | 10 | 11 | 20 | 30 | 10 | Sum: 112 |
|---|---|---|---|---|---|---|
| 09 | 18 | 19 | 29 | 39 | 48 | Sum: 162 |

TABLE 6-B

Numeric Sum Table

| Number | Template | Min. sum | Ave. sum | Max sum |
|---|---|---|---|---|
| 1 | yellow blue blue gray green pink | 112 | 137 | 162 |
| 2 | yellow blue gray gray green pink | 122 | 147 | 172 |
| 210 | pink pink pink pink pink pink | 255 | 264 | 273 |

TABLE 7

"Drawings Map" of template 1 for the Super Sena
Template 1     Average Numeric Sum: 137     Facts: 33*

| Date | Draw | Numbers drawn | Sum |
|---|---|---|---|
| | 36 | 07 14 16 29 31 41 | 138 |
| | 45 | 04 12 19 25 33 45 | 138 |
| | 75 | 05 13 17 20 33 42 | 130 |

TABLE 7-continued

"Drawings Map" of template 1 for the Super Sena
Template 1    Average Numeric Sum: 137    Facts: 33*

| Date | Draw | Numbers drawn | Sum |
|---|---|---|---|
|  | 97 | 08 13 16 27 30 45 | 139 |
|  | 99 | 09 13 16 20 37 47 | 142 |
| 09/10/1997 | 134A | 01 17 18 29 33 43 | 141 |
| 22/01/1998 | 162B | 02 11 16 20 36 42 | 127 |
| 05/02/1998 | 166B | 01 12 16 24 33 48 | 134 |
| 01/04/1998 | 181A | 07 13 17 27 31 42 | 137 |
| 16/05/1998 | 194B | 06 17 19 24 33 40 | 139 |
| 07/04/2001 | 487A | 02 17 19 26 37 42 | 143 |

TABLE 8

"Columns Table" for a 6-48 type game

| Template number | Template | | | | | % Calc. | After 300 drawings % Facts | Facts | Facts per block of 100 drawings Start: 1 End: 100 | Start: 101 End: 200 | Start: 201 End: 300 |
|---|---|---|---|---|---|---|---|---|---|---|---|
| 3 | Yellow | blue | gray | green | green | pink | 2.97 | 3.02 | 26 | 2 | 1 | 5 |
| 14 | Yellow | gray | gray | green | green | pink | 1.34 | 1.40 | 12 | 1 | 1 | 2 |
| 32 | Yellow | gray | green | green | pink | pink | 1.19 | 1.28 | 11 | 1 | 2 | 2 |
| 75 | Yellow | gray | gray | gray | green | green | 0.40 | | | | | |

TABLE 9

Columns C1 and C2

| | C1 | C2 | C3 | C4 | C5 | C6 | Quantity |
|---|---|---|---|---|---|---|---|
| 1 | 10 | 11 | | | | | 3 |
| 2 | 10 | 12 | | | | | 6 |
| 3 | 10 | 13 | | | | | 4 |
| 4 | 10 | 14 | | | | | 2 |
| 5 | 10 | 15 | | | | | 2 |
| 6 | 10 | 16 | | | | | 1 |
| 7 | 10 | 17 | | | | | 1 |
| 8 | 10 | 18 | | | | | 2 |
| 9 | 10 | 19 | | | | | 1 |
| | | | | | | | 22 |

TABLE 9-A

Columns C2 and C3

| | C1 | C2 | C3 | C4 | C5 | C6 | Quantity |
|---|---|---|---|---|---|---|---|
| 1 | | 10 | 13 | | | | 2 |
| 2 | | 10 | 14 | | | | 1 |
| 3 | | 10 | 15 | | | | 1 |
| 4 | | 10 | 16 | | | | 3 |
| 5 | | 10 | 17 | | | | 4 |
| 6 | | 10 | 18 | | | | 1 |
| 7 | | 10 | 19 | | | | 1 |
| | | | | | | | 13 |

TABLE 9-B

Columns C3 and C4

| | C1 | C2 | C3 | C4 | C5 | C6 | Quantity |
|---|---|---|---|---|---|---|---|
| 1 | | | 10 | 12 | | | 1 |
| 2 | | | 10 | 17 | | | 1 |
| 3 | | | 10 | 19 | | | 3 |
| | | | | | | | 5 |

TABLE 9-C

Columns C4 and C5

| | C1 | C2 | C3 | C4 | C5 | C6 | Quantity |
|---|---|---|---|---|---|---|---|
| 1 | | | | 10 | 11 | | 1 |
| 2 | | | | 10 | 15 | | 1 |
| 3 | | | | 10 | 18 | | 1 |
| | | | | | | | 3 |

TABLE 9-D

Columns C5 and C6

| C1 | C2 | C3 | C4 | C5 | C7 | Quantity |
|---|---|---|---|---|---|---|
| | | | | | | 0 |

TABLE 10

| C1 | C2 | C3 | C4 | C5 | C6 |
|---|---|---|---|---|---|
| yellow | blue | blue | gray | gray | pink |

TABLE 11

| Probability of template | Quantity of templates | % expected | % | Templates |
|---|---|---|---|---|
| 2.97 | 3 | 30.00 | 33.00 | show |
| 2.64 | 2 | 27.00 | 24.00 | show |
| 1.49 | 6 | 15.00 | 14.00 | show |

TABLE 11-continued

| Probability of template | Quantity of templates | % expected | % | Templates |
|---|---|---|---|---|
| 1.34 | 3 | 14.00 | 12.00 | show |
| 1.32 | 6 | 13.00 | 11.00 | show |

TABLE 12

| Start | | | | | | Abbreviated name |
|---|---|---|---|---|---|---|
| yellow | | | | | | 0 |
| Yellow | Yellow | | | | | 00 |
| Yellow | Yellow | Yellow | | | | 000 |
| Yellow | Yellow | Yellow | Yellow | | | 0000 |
| Yellow | Yellow | Yellow | Yellow | Yellow | | 00000 |
| yellow | Yellow | yellow | Yellow | yellow | Yellow | 000000 |
| blue | | | | | | 1 |
| Blue | Blue | | | | | 11 |
| Blue | Blue | Blue | | | | 111 |
| Blue | Blue | Blue | Blue | | | 1111 |
| Blue | Blue | Blue | Blue | Blue | | 11111 |
| Blue | Blue | blue | blue | blue | blue | 111111 |
| Gray | | | | | | 2 |
| Gray | Gray | | | | | 22 |
| Gray | Gray | Gray | | | | 222 |
| Gray | Gray | Gray | Gray | | | 2222 |
| Gray | Gray | Gray | Gray | Gray | | 22222 |
| Gray | Gray | Gray | Gray | Gray | Gray | 222222 |
| green | | | | | | 3 |
| Green | Green | | | | | 33 |
| Green | Green | Green | | | | 333 |
| Green | Green | Green | Green | | | 3333 |
| Green | Green | Green | Green | Green | | 33333 |
| green | Green | green | Green | green | green | 333333 |
| pink | Pink | pink | pink | pink | pink | 444444 |

TABLE 13

| Start Columns Table | Results | | | | | % | % | | |
|---|---|---|---|---|---|---|---|---|---|
| blue | | | | | | 9.68 | 9.26 | show | show |
| Blue | Blue | | | | | 8.71 | 8.71 | show | show |
| Blue | Blue | Blue | | | | 3.57 | 4.74 | show | show |
| Blue | Blue | Blue | Blue | | | 0.69 | .44 | show | show |
| Blue | Blue | Blue | Blue | Blue | | 0.06 | | | |
| blue | blue | Blue | blue | Blue | Blue | 0.00 | | | |
| gray | | | | | | 0.95 | 1.76 | show | show |
| Gray | Gray | | | | | 1.42 | 0.77 | show | show |
| Gray | Gray | Gray | | | | 0.95 | 1.21 | show | show |
| Gray | Gray | Gray | Gray | | | 0.29 | 0.11 | show | show |
| Gray | gray | Gray | gray | Gray | | 0.04 | 0.11 | show | show |
| gray | gray | gray | gray | Gray | gray | 0.00 | | | |

TABLE 14

| Start 1 Template | Columns | | | | | | % Calc. | After 300 drawings % Facts | Facts | Start: 1 End: 100 | Facts per block of 100 drawings Start: 101 End: 200 | Start: 201 End: 300 |
|---|---|---|---|---|---|---|---|---|---|---|---|---|
| | | | | | | | 9.68 | 9.67 | 29 | | | |
| 19 | blue | gray | gray | green | pink | pink | 1.32 | 0.67 | 2 | 1 | 1 | |
| 151 | blue | green | pink | pink | pink | pink | 0.10 | 0.33 | 1 | | | 1 |

TABLE 15

| Start 1 | Set | PP | T | TP | Q | V | | |
|---|---|---|---|---|---|---|---|---|
| Calculation (%) at the start | | 4.13 | 2.44 | 2.2 | 0.84 | 0.05 | | |
| Facts: 84 | | 44 | 19 | 18 | 3 | 0 | | |
| Facts (%) | | 4.85 | 2.09 | 1.98 | 0.33 | 0.00 | | |
| Date | Drawing | Columns | | | | | | |
| 28/09/1997 | 131[A] | 17 | 21 | 30 | 36 | 39 | 40 | 41 |
| 02/10/1997 | 132[A] | 10 | 21 | 23 | 31 | 35 | 45 | 11 |
| 19/10/1997 | 137B | 15 | 24 | 28 | 33 | 37 | 47 | 11 |
| 02/11/1997 | 141B | 12 | 22 | 27 | 30 | 32 | 39 | 71 |

The invention system makes it possible to view comparisons between what is expected (the average probability of a pattern to be drawn) and what actually occurs (real results of lottery drawings). The knowledge can help build a game strategy, by choosing the patterns with a better chance of occurrence. The system provides for a user theoretical tables that show what is expected to occur with the patterns (average probability), result tables that show actual results of each pattern in actual drawings, and control panels which cross expected results with actual ones. In order to simplify decision-making and visualize the results, the colored patterns have been divided into two basic groups, the "types" and the "starts". Types classify patterns according to the number of color occurrences (pair of one color, trine of one color, etc.) as described above. The grouping of patterns according to their type was shown in the respective table of theoretical probability. For example, in a 6/48 lottery, the patterns type PP (two pairs of distinctive colors) have 38.27% chances coming out. Therefore, there would be around 38 occurrences of this type in every 100 drawings.

Starts are the start of a pattern, determined by its initial ten (color) and by the number of times it appears. The grouping of patterns by start is shown in its specific table. Start 0 of a lottery 6/49 has a theoretical probability of occurrence of 42.23%. This means that there would be about 42 occurrences in every 100 drawings. The simplest and most effective way to define a game strategy is by finding out which groups of patterns (start and type) have a wider difference in comparison with the expected results. One strategy is the advanced strategy where a player would play on groups which occur more frequently than expected while another is the delayed strategy where a player chooses groups which were drawn less times than expected. After defining a strategy, the player looks for the best patterns of the chosen group.

The system provides the user with tools to help plan a selection for a game, providing means to search groups with greatest divergence in relation to theoretical results, to view pattern statistics and see the consolidated position of starts and types, providing control panels to observe the behavior of the starts and types through time, and providing drawing tables to view the groups behavior at the latest drawings The system also provides generated search pattern statistics to find the best patterns within the chosen start and type, and allowing a user to use the drawings to identify patterns that aren't usually repeated within a short space of time.

The comprehensive system additionally has a random play analyzer, numbers combiner and results checker, all available to a user having the higher level subscription service.

As described above, winning a lottery is not merely a matter of luck. By having access to the templates, tools and tables generated by a computer, which are constantly updated, a person may create a game stately related to the behavior pattern of the lottery drawings, based on mathematics and probabilities, presented in a format that visualizes the patterns and selections so one having no familiarity with mathematics or probabilities can easily use the tools for selecting numbers for a lottery drawing. By subscribing to the inventive system, a user has access to the tables with behavior patterns for the specific lottery, patterns of games with their respective drawing probabilities and updated information in accordance with drawing results. Preferably, a user would subscribe for a time period, for example 6 months, for a single lottery, with all the tools available for that time period related to that lottery. A basic subscription may provide access, for example, to the theoretical tables of probability, of the patterns, of the types and of the starts, a drawing results table and drawing results map, a control panel of starts, of the types and of the patterns, and statistics, simple as well as positional and pattern statistics. Optional features of a higher level subscription may include a random play theoretical table, numbers combiner and results checker.

While preferred embodiments of the present invention have been shown and described, it will be understood by those skilled in the art that various changes or modifications may be made without varying from the scope of the invention.

I claim:

1. A method for selecting numbers for a game of prediction such as a lottery drawing where a specific subset of numbers are selected from a defined set of numbers, the method comprising:

breaking down the defined set of numbers to sequential group of numbers, assigning a color to each sequential group of numbers;

using a computer based system for generating all the possible outcomes of the lottery drawing;

generating relevant statistics for the lottery drawing;

generating a plurality of templates, using the relevant statistics, the plurality of templates representing all of the possible subsets of colors patterns, for all of the possible outcomes of the lottery drawing, each template displaying all the subsets of number combinations for a particular color pattern, and displaying the statistics identifying a situation of equilibrium for each selection of a specific subset of numbers in the defined set of numbers which may be picked in the lottery drawing, each template containing "Discrete Sample Spaces" for determining theoretical probabilities of the outcomes of the lottery drawing, the computer based system performing calculations and identifying the probabilities that a particular sequence of numbers will be chosen, within a Standard Deviation, the computer based system formulating predictions based on the statistics, and incorporating the probability on the templates representing all the possible lottery drawing outcomes;

accessing the system;

entering a particular subset of numbers into the system;

viewing the template for the color pattern represented by the entered subset of numbers;

using the probability data to determine whether the particular subset of numbers or other numbers sharing the same color pattern of the template should be chosen by the user.

2. The method of claim 1 further comprising providing each template with a theoretical probability calculated based on a determination of the probability wherein an increase in a number of lottery drawings increases the probability that an observed average will not deviate more than 2% from a true average.

3. The method of claim 1 further comprising generating constructive operational variables for determining a probabilistic mathematical model for predicting the outcome of the lottery drawing.

4. The method of claim 1 wherein a user first selects a particular color pattern, and then reviews the template displaying the particular group color pattern which reveals each subset of numbers, identifying the subsets having a higher or lower probability of being drawn together, thereby allowing a user to select a subset of numbers by combining colors in an organized way in predetermined spaces.

5. The method of claim 1 further comprising displaying information on the prior lottery drawing results in a table with each template, supplying the displayed information to a user so the user can compare actual results with the predicted results so that a higher probability number selection strategy can be formulated.

6. The method of claim 1 wherein each sequential group of numbers is a decile containing up to ten sequential numbers.

7. The method of claim 6 wherein each decile group is assigned a name defined by a first number of the sequential numbers assigned to the group.

8. The method of claim 1 wherein the lottery drawing has a defined set of up to 80 sequential numbers, and the subset of numbers drawn therefrom in the lottery drawing contains from 5 to 7 numbers.

9. The method of claim 1 wherein the combinations of colors contain a pattern selected from the group consisting of one color from each group, a pattern containing at least one pair of the same color, three of the same color, and from four of the same color up to all of the same color.

10. The method of claim 1 further comprising illustrating patterns by color which follow a very precise logical coherence, related to the causes of the occurrence of the patterns.

11. The method of claim 1 wherein the templates are defined by a product of the combinations which they represent, the templates relating to quantified behavior patterns which indicate the theoretical probabilities when all the Sample Spaces are brought into operation.

12. The method of claim 1 further comprising providing a Theoretical Probability Table illustrating the templates organized in decreasing order of occurrence, each template indicating a number, its color representation and its theoretical probability calculation.

13. The method of claim 1, further comprising providing a Drawings Table having organized therein the results of all prior drawings, providing additional information selected from the group consisting of the date of the drawing, the number, the numbers drawn indicated in colors, a template number placed in a column corresponding to its type, or combinations thereof.

14. The method of claim 1 wherein the templates have a theoretical probability and a numeric sum for each subset selected, for identifying a range of selected outcomes where the chances of winning are greater, the numeric sum corresponding to a sum of all the numbers drawn in the lottery drawing, the template showing a maximum and a minimum value of the numeric sum, and providing an average between these two values to identify where the greatest number of drawings will fall.

15. The method of claim 1 further comprising providing a drawing map table containing historical data on the lottery drawings, on the template, the drawing map table showing all the drawings of each template, the date, number of the drawing, numbers drawn and the average numeric sum.

16. The method of claim 1 further comprising providing a Columns Table showing the behavior of each template over a period for a plurality of lottery drawings, divided into blocks of 100, illustrating the fluctuations of the templates, cross-referencing the calculation with the actual drawing outcomes.

17. The method of claim 1 wherein the statistics refer to numbers, pairs, trifles, etc., for each decile, the positional statistic illustrating the total occurrence of the numbers, pairs, trines, etc., per decile in each possible position, and, further comprising using the positional statistic for analyzing a template.

18. The method of claim 1 further comprising providing a Theoretical Probability Table illustrating the templates in order of probability, such that a reorganization of the Theoretical Probability table, where the templates are grouped with the same initial colors, provides a Positional Table.

19. The method of claim 1 further comprising a Start Table illustrating a very quick convergence between the lottery outcomes and the calculations, the Start Table being an analysis tool for formulating number selection strategies by showing where the lottery drawings are ahead or behind relative to the statistical calculation.

20. The method of claim 1 further comprising providing a Columns Table located on a left side of the templates, the templates selected in order of theoretical probability, three columns located at the right side for illustrating the data divided into blocks of 100 drawings per block, and links for navigation through the blocks located on the right side at the top thereof.

* * * * *